(12) United States Patent
Haberler

(10) Patent No.: US 7,520,424 B2
(45) Date of Patent: Apr. 21, 2009

(54) IDENTIFICATION STORAGE MEDIUM ARRANGEMENT, A READ APPARATUS AND AN IDENTIFICATION SYSTEM

(75) Inventor: Berthold Haberler, Österreich (AT)

(73) Assignee: RF-IT Solutions GmbH, Graz (AT)

( * ) Notice: Subject to any disclaimer, the term of this patent is extended or adjusted under 35 U.S.C. 154(b) by 430 days.

(21) Appl. No.: 11/193,031

(22) Filed: Jul. 29, 2005

(65) Prior Publication Data
US 2006/0027646 A1 Feb. 9, 2006

(30) Foreign Application Priority Data
Aug. 2, 2004 (DE) .................. 10 2004 037 347

(51) Int. Cl.
*G06K 5/00* (2006.01)
(52) U.S. Cl. .................. 235/380; 235/494; 235/492
(58) Field of Classification Search .................. 235/375, 235/487, 492, 494, 380
See application file for complete search history.

(56) References Cited

U.S. PATENT DOCUMENTS 4,752,680 A 6/1988 Larsson .................. 235/492
6,478,229 B1 * 11/2002 Epstein .................. 235/492
6,639,514 B1 10/2003 Muller .................. 340/572.5
7,088,245 B2 8/2006 Guntersdorfer et al. .. 340/572.5

FOREIGN PATENT DOCUMENTS

DE 199 50 145 C1 5/2001
DE 199 53 334 C2 5/2002
DE 101 63 267 7/2003

OTHER PUBLICATIONS

Meyer, Angela; RFID—Technik löst Barcode-Eiketten ab; "Magazine for Computers and Engineering"; Mar. 2004; p. 46; Heise Zeitschriften Verlag; Deutschland.
Office Action issued in German counterpart application No. 10 2004 037 347.7-53 dated Nov. 6, 2007 (7 pages in German).

* cited by examiner

Primary Examiner—Karl D. Frech
(74) Attorney, Agent, or Firm—Brinks Hofer Gilson & Lione

(57) ABSTRACT

The invention relates to an identification data-storage medium arrangement which contains payload data split into payload data subareas and which contains payload data linking data for linking the payload data subareas, having a plurality of identification data-storage media each having a substrate, an antenna which is formed on and/or in the substrate and an integrated circuit which is formed on and/or in the substrate, is coupled to the antenna and has a memory circuit element in which one of the payload data subareas and associated payload data linking data are stored, in which case the payload data subarea can be assembled to form payload data using the associated payload data linking data.

14 Claims, 2 Drawing Sheets

IDENTIFICATION STORAGE MEDIUM ARRANGEMENT, A READ APPARATUS AND AN IDENTIFICATION SYSTEM

RELATED APPLICATIONS

The present patent document claims priority to German Application Serial No. 10 2004 037 347.7-53, filed Aug. 2, 2004, the entirety of which is hereby incorporated by reference.

FIELD OF THE INVENTION

The invention relates to an identification data-storage medium arrangement, to a read apparatus and to an identification system.

BACKGROUND

Identification marks are used for identification of people or objects in many fields of daily life. According to the prior art, identification marks based on barcodes are used, although these are labor-intensive and thus expensive in use, since they must be read using a complex optical read apparatus.

One alternative to barcode systems is "Radio Frequency Identification Tags" (RFID Tags). An RFID tag normally contains an antenna, a circuit for reception and transmission of electromagnetic waves (transponder) and a signal processing circuit. An RFID tag such as this is thus frequently formed on a small silicon chip, which is connected to an antenna that is applied to a plastic mount.

An RFID tag makes it possible to read and store data without making any contact. Data such as this is stored on RFID tags (clearly electronic labels). The stored data is read by means of electromagnetic waves which can be injected into the RFID tag via the antenna.

Fields of operation for an RFID tag are electronic security systems for theft prevention, applications in automation (for example the automatic identification of vehicles in the traffic for toll payment systems), access monitoring systems, cashless payment, ski passes, fuel cards, animal identification and applications in logistics.

RFID tags are thus small transponders which can be read by radio and are formed from a memory chip and an antenna. A unique electronic product code (EPC) can also be stored in the memory chip and may possibly replace the conventional thirteen-digit EAN barcode ("European Article Number") that is now in commercial use. Each individual product can be provided with a unique number throughout the world, by means of the EPC code. The memory chip can also store certain amounts of data—directly on the object—which can be called up at any time, without any connection to a database.

Many German and foreign companies from the retail sector are planning to use RFID technologies in the supplier area. The volume of investment just in the USA up to the year 2008 is estimated to be $1.3 million US dollars (see [1]).

However, modern available RFID transponders have very small memory capacitors, so that only a small number of bytes of information can frequently be stored. Information comprising a plurality of kilobytes can thus not be stored with such known RFID tags. The aim in an RFID system for example in an RFID aided automatic inventory system, is to store relatively large amounts of data directly at the object and thus at the transponder ("Data on Tag", DOT), and this is often not feasible, while maintaining full function, with modern commercially-available transponders owing to the small available memory capacity. One field of application in which such large amounts of data occur is the storage of maintenance data for a technical installation or machine, or for a relatively high-value item on an RFID tag.

A schematically illustrated identification data-storage medium 100 according to the prior art will be described in the following text with reference to FIG. 1.

The identification data-storage medium 100 (that is to say an RFID tag) contains a memory device 102 in which data for a specific amount of storage, for example 8 bytes, can be stored. If the aim is to store data for a data model 101 (that is to say data containing information) in the memory 102 of the transponder 100, then, if the data model 101 is too large, this amount of data no longer fits as an entity into the memory device 102 for the RFID tag 100.

According to the prior art, the amounts of data are thus either cut down and/or are stored in compressed form on the transponder owing to the restricted memory capacity of the RFID transponders, to such an extent that only the absolutely necessary data is stored. In the extreme, this can even lead in some cases to only the UID ("Unique Identifier") of the RFID transponder being stored as an identification feature in the memory area of the RFID. Additional object data is then taken from an external database. However, this results in the actual major advantage of RFID tags being lost, this being that the data is all available directly in the transponder, and thus directly at the object.

BRIEF SUMMARY

The invention is based on the problem of making it possible to store even relatively large amounts of information in identification data-storage media, and thus making such relatively large amounts of information available directly at an object.

This problem is solved by an identification data-storage medium arrangement, by a read apparatus and by an identification system having the features as claimed in the independent patent claims.

The identification data-storage medium arrangement, which contains payload data subdivided into payload data subareas, and which contains payload data linking data for linking the payload data subareas, has a plurality of identification data-storage media. Each of the identification data-storage media, contains a substrate, an antenna which is formed on and/or in the substrate and an integrated circuit which is formed on and/or in the substrate, is coupled to the antenna and has a memory circuit element, in which one of the payload data subareas and associated payload data linking data are stored. The payload data subareas can also be assembled to form payload data using the associated payload data linking data.

The read apparatus according to the invention for reading payload data which is contained in a plurality of identification data-storage media in an identification data-storage medium arrangement and is subdivided into payload data subareas, in which case the payload data subareas can be linked by means of payload data linking data, contains a detection device for detection of signals which are transmitted by antennas for the identification data-storage media, which signals contain a payload data subarea (which is contained in the respective identification data-storage medium) and associated payload data linking data. The read apparatus furthermore contains a determination device for determination of the payload data subareas and of the associated payload data linking data, and for determination of the payload data by linking the payload data subareas in accordance with the associated payload data linking data.

One fundamental idea of the invention is for the information to be stored in an identification data-storage medium to be split between a plurality of identification data-storage media, that is to say into payload data subareas and, furthermore, for data linking information to be stored in the memory areas, by means of which data linking information the individual payload data subareas can be assembled so as to make it possible to recover the payload data. In consequence, fundamentally any desired amount of information can be stored in the identification data-storage medium arrangement, to be precise directly at an object to which the identification data-storage medium are applied. Fundamentally, conventional identification data-storage media (for example RFID tags) can be used in the identification data-storage medium arrangement, although their restricted memory capacity is, however, no longer restricted by the provision, according to the invention, of a plurality of linked identification data-storage media. It is thus even possible to satisfy applications in which a large amount of data has to be stored on the identification data-storage media, for example maintenance data for a technical installation or machine or a relatively high-value item, using the identification data-storage medium arrangement according to the invention. In this case, a large amount of data is available directly at the object.

In other words, in addition to the pure payload data, management data structures are provided in the memory circuit elements of the identification data-storage media, from which it is evident how the actual payload data is distributed between a plurality of transponders. This allows relatively large amounts of data to be distributed between a plurality of transponders. One important aspect of the invention can obviously be described by the keyword "Data on multiple Tag".

The multiple identification data-storage media (transponders) can all be fitted sufficiently close to one another on the object. They can thus be identified by the read apparatus according to the invention as a group or as associated identification data-storage media, in this way allowing them to be read (for example sequentially). The management structures (payload data linking data) for the identification data-storage media then allow seamless combination of the payload data subareas in order to recover the payload data in the correct sequence as if this data were associated with a single large transponder.

In this way, the invention makes it possible to retrospectively add additional transponders or identification data-storage media to the identification data-storage medium arrangement as required (that is to say even later in the course of a system upgrade), if the combined memory space is too small or becomes too small, or is found to be too small over the course of time, for example because more data has been added over the course of time that can be stored in the identification data-storage media so far available in the identification data-storage medium arrangement.

One important aspect of the invention is thus to split the payload data for an RFID system (payload data model, payload data block) between a plurality of transponders—which can be read sequentially or simultaneously—so that the total number of transponders appears like a single large memory to the higher-level system. A further important aspect is the idea that payload data linking data (management data structures) can for this purpose be introduced in addition to the payload data into the memory circuit elements of the identification data-storage media.

A data model/data record is thus split between a plurality of transponders. In addition, management data structures are stored in each transponder.

In summary, one important aspect of the invention is that a large number of RFID tags are fitted to one product, data is stored in the memory of the RFID tag and data linking information is stored in the memory of the RFID tags and is used to link the data. The read apparatus according to the invention can be used by a user to read information on the product or to write information to the product, for example maintenance data for an installation that even involves an amount of memory of more than one kilobyte. According to the invention, the data storage is split between a plurality of RFID transponders.

The data from the individual identification data-storage media can be read jointly in a single complete file, or can be read successively as information elements from the individual identification data-storage media. Using known models, for example so-called "anticollision procedures" it is possible to determine which transponders are located in the antenna field of the read apparatus, and a response list of responding transponders can then be produced, after which the transponders can be actuated and read separately.

Preferred developments of the invention are specified in the dependent claims.

The payload data may contain identification details. Such identification details may, for example, be the UID (Unique Identifier) for the respective identification data-storage medium.

The payload data may contain product information data about a product. For example, the payload data may contain information about the price of the product and/or technical information about the product to which the identification data-storage medium arrangement (that is to say the individual identification data-storage media) can be attached.

Furthermore, the payload data may contain maintenance information data about the maintenance of a product. When a product is being maintained, for example a complicated technical machine or installation, then a large amount of maintenance information data is involved during this process, which may increase continuously during maintenance over a lengthy period of time. This data can be stored as payload data on the identification data-storage media and, when it exceeds the capacity of a memory circuit element of one of the identification data-storage media, can be split into a plurality of payload data subareas in different identification data-storage media.

The payload data linking data may contain a number for the respective identification data-storage medium and the total number of identification data-storage media. If, for example, the x-th identification data-storage medium is considered by a total of y identification data-storage media, then this can transmit the information to a read apparatus that it is the x-th of a total of y identification data-storage media. This allows the payload data subareas to be assembled without any gaps.

The payload data linking data may contain a start address and/or an end address of the associated payload data subarea within the payload data. The payload data subareas can be assembled unambiguously to form the payload data using this start address and end address.

The payload data linking data may contain identification details for an identification data-storage medium which precedes the identification data-storage medium, and/or an identification data-storage medium which follows the identification data-storage medium. This information also makes it possible to arrange the identification data-storage media and thus the associated payload data subareas unambiguously in the correct sequence.

At least one of the identification data-storage media may be designed as a radio frequency identification tag. A radio frequency identification tag such as this contains an antenna, a circuit for reception and transmission of electromagnetic waves (transponder) and a signal processing circuit. An RFID tag such as this can be mounted on a small silicon chip or can be monolithically integrated in it, in which case the silicon chip can be connected to an antenna which is fitted to a plastic mount.

Refinements of the read apparatus according to the invention will be described in the following text. Refinements of the read apparatus also apply to the identification data-storage medium arrangement, and vice versa.

An electromagnetic radiation source for emission of electromagnetic radiation in a frequency range which can be predetermined and can be received by the antennas of the identification data-storage media can be provided for the read apparatus. An electromagnetic radiation source such as this may, in particular, be a radio-frequency radiation source which, for example, can emit electromagnetic radiation in the region of 13.56 MHz. This electromagnetic radiation can be used by the associated identification data-storage media to supply electrical power to the circuit components contained in them.

The read apparatus may be designed for sequential reading of the identification data-storage media. In other words, the identification data-storage media and the information contained in them (payload data subarea, payload data linking data) can be read successively.

Alternatively, the read apparatus may be designed for simultaneous reading of the identification data-storage media, that is to say for simultaneous reading of a plurality of identification data-storage media.

The read apparatus may have an error identification device which is designed to identify and possibly to indicate (possibly) incorrect linking of the payload data subareas. If, by way of example, the read apparatus finds that the information stored in the seventh of ten RFID transponders have not bee transmitted correctly (for example because this data has not been assembled without any gaps together with data transmitted from other RFID transponders), then an error indication function can emit, for example on a monitor, the information "to the seventh of ten RFID tags which has the UID . . . has not been read correctly. Please try to transmit the information again . . . ".

Although the refinements have been described with reference to the identification data-storage medium arrangement according to the invention and with respect to the read apparatus according to the invention, these refinements also apply to the identification system according to the invention.

BRIEF DESCRIPTION OF THE DRAWINGS

Exemplary embodiments of the invention will be explained in more detail in the following text and are illustrated in the figures, in which.

Identical or similar components are provided with the same reference numbers in the various figures. The illustrations in the figures are schematic, and not to scale.

DETAILED DESCRIPTION OF THE DRAWINGS

An identification data-storage medium arrangement 200 according to one exemplary embodiment of the invention will be described in the following text with reference to FIG. 2.

Figure 1:
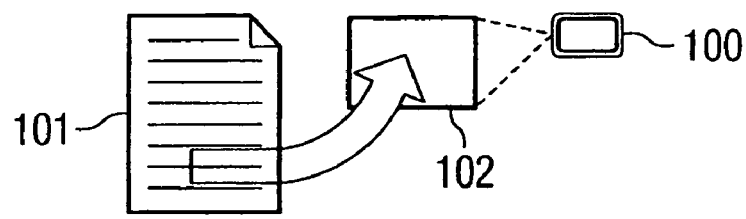
FIG. 1 shows an identification data-storage medium according to the prior art.
Figure 2:
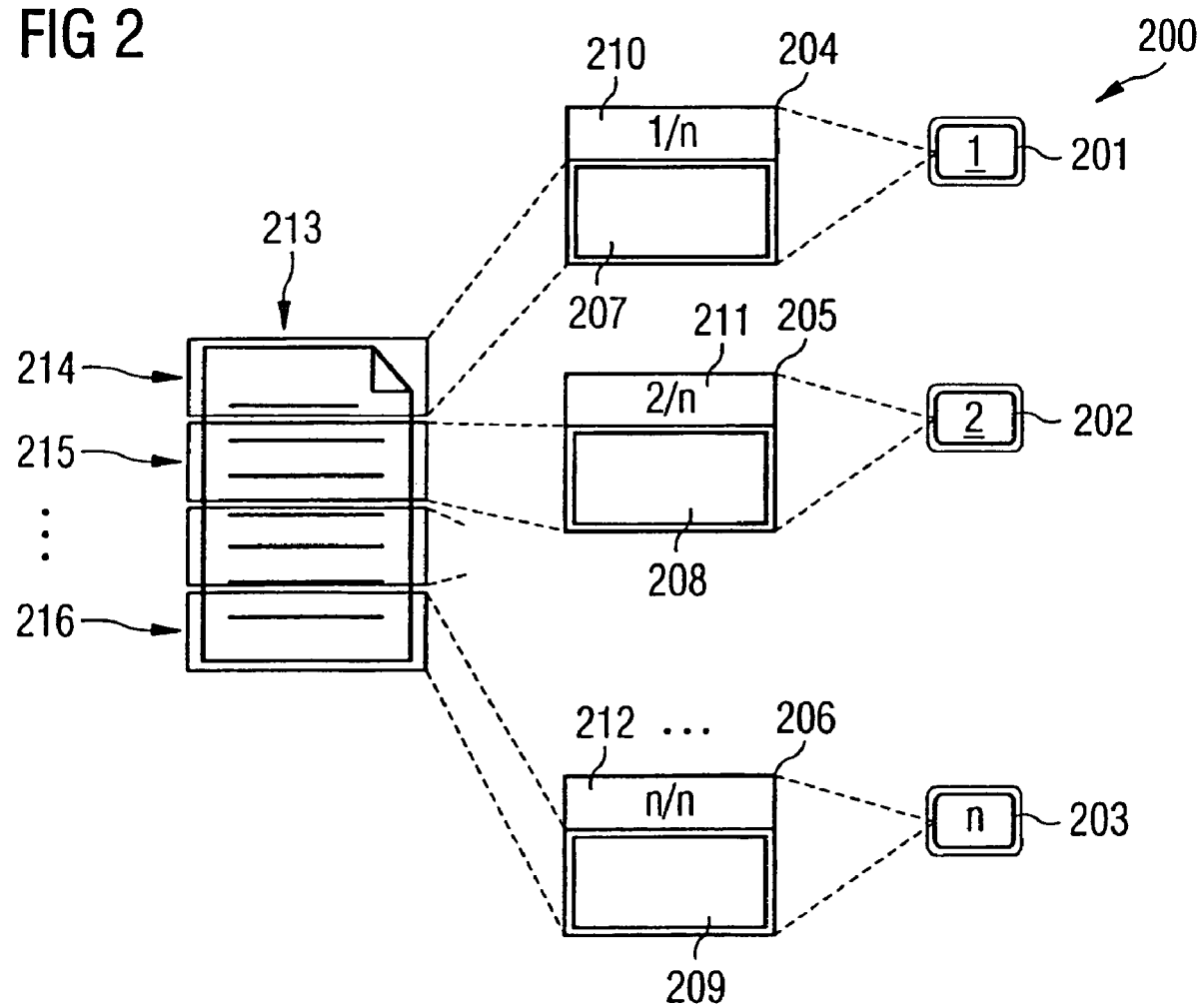
FIG. 2 shows an identification data-storage medium arrangement according to one exemplary embodiment of the invention.

FIG. 2 shows maintenance data 213 which has been split into first, second, . . . , n-th maintenance data subareas 214, 215, . . . , 216 in accordance with a data model. This data characterizes the maintenance state of a technical installation to which the identification data-storage medium arrangement 200 is fitted.

The identification data-storage medium arrangement 200 contains n identification data-storage media (that is to say n RFID tags), specifically a first identification data-storage medium 201, a second identification data-storage medium 202, . . . , and an n-th identification data-storage medium 203. Furthermore, as can be seen from FIG. 2, each of the n identification data-storage media 201 to 203 has an associated memory area, for example an EEPROM, a flash memory etc. A first non-volatile memory 204 is thus associated with the first identification data-storage medium 201, a second non-volatile memory 205 is associated with the second identification data-storage medium 202, . . . , and an n-th non-volatile memory 206 is associated with the n-th identification data-storage medium 203.

Each of the identification data-storage media 201 to 203 is in the form of an RFID tag and contains a substrate, a transmitting/receiving antenna formed on the substrate, and a circuit which is monolithically integrated in the substrate, is coupled to the antenna and has a respective memory circuit element 204 to 206.

A first payload data subarea 207 is stored in the first non-volatile memory 204, with the first maintenance data subarea 214 being stored in this first payload data subarea 207. A second payload data subarea 208 is stored in the second non-volatile memory 205, with the second maintenance data subarea 215 being stored in this second payload data subarea 208. A third payload data subarea 209 is stored in the n-th non-volatile memory 206, with the third maintenance data subarea 216 being stored in the third payload data subarea 209. Furthermore, first payload data association data 210 is stored in the first non-volatile memory 204, second payload data association data 211 is stored in the second non-volatile memory 205, . . . , and n-th payload data association data 212 is stored in the n-th non-volatile memory 206.

The identification data-storage media 201 to 203 are designed such that the payload data subareas 207 to 209 can be assembled to form the maintenance data 213 from the signals which can be transmitted from the antennas and which contain the respective payload data subareas 207 to 209 and associated payload data linking data 210 to 212. In other words, the first to the n-th payload data association data 210 to 212 contain management data structures which are stored or can be stored in the individual transponders 201 to 203 in addition to the data 214 to 216 that has been split from the data model 213.

When a reader (not shown in FIG. 2) communicates with the transponders 201 to 203, the transponders 201 to 203 transmit, for example, electromagnetic waves successively or simultaneously to the reader, which electromagnetic waves contain the payload data subareas 207 to 209 contained in the respective non-volatile memories 204 to 206 as well as payload data association data 210 to 212 contained additionally in the non-volatile memories 204 to 206.

The read apparatus, which is not shown in FIG. 2, extracts the payload data subareas 207 to 209 as well as the payload data association data 210 to 212 from the transmitted signals and uses the payload data association data 210 to 212 to assemble the determined payload data subareas 207 to 209 to form the maintenance data 213. Simultaneous reading is possible using the so-called "anti-collision procedures" or "air interference protocols", so that it is possible to separate the individual signals from the transponders 201 to 203 from one another. The transmission at different frequencies also allows the transponders 201 to 203 to be read and actuated separately and without any disturbing interactions.

Table 1 shows how the management data structures, that is to say the payload data association data 210 to 212, can be designed in order to allow the payload data subareas 207 to 209 to be assembled without any gaps to form the maintenance data 213 in the reader.

TABLE 1

| Data Structure Element | Description |
|---|---|
| X/Y | "this is the transponder X of a total of Y transponders" |
| Data Split Start | Start address of the split from the linear memory of the data model in the current transponder |
| Data Split End | End address of the split from the linear memory of the data model in the current transponder |
| UID Previous | UID ("Unique Identifier") of the preceding transponder |
| UID Consecutive | UID ("Unique Identifier") of the subsequent transponder |

Figure 3:
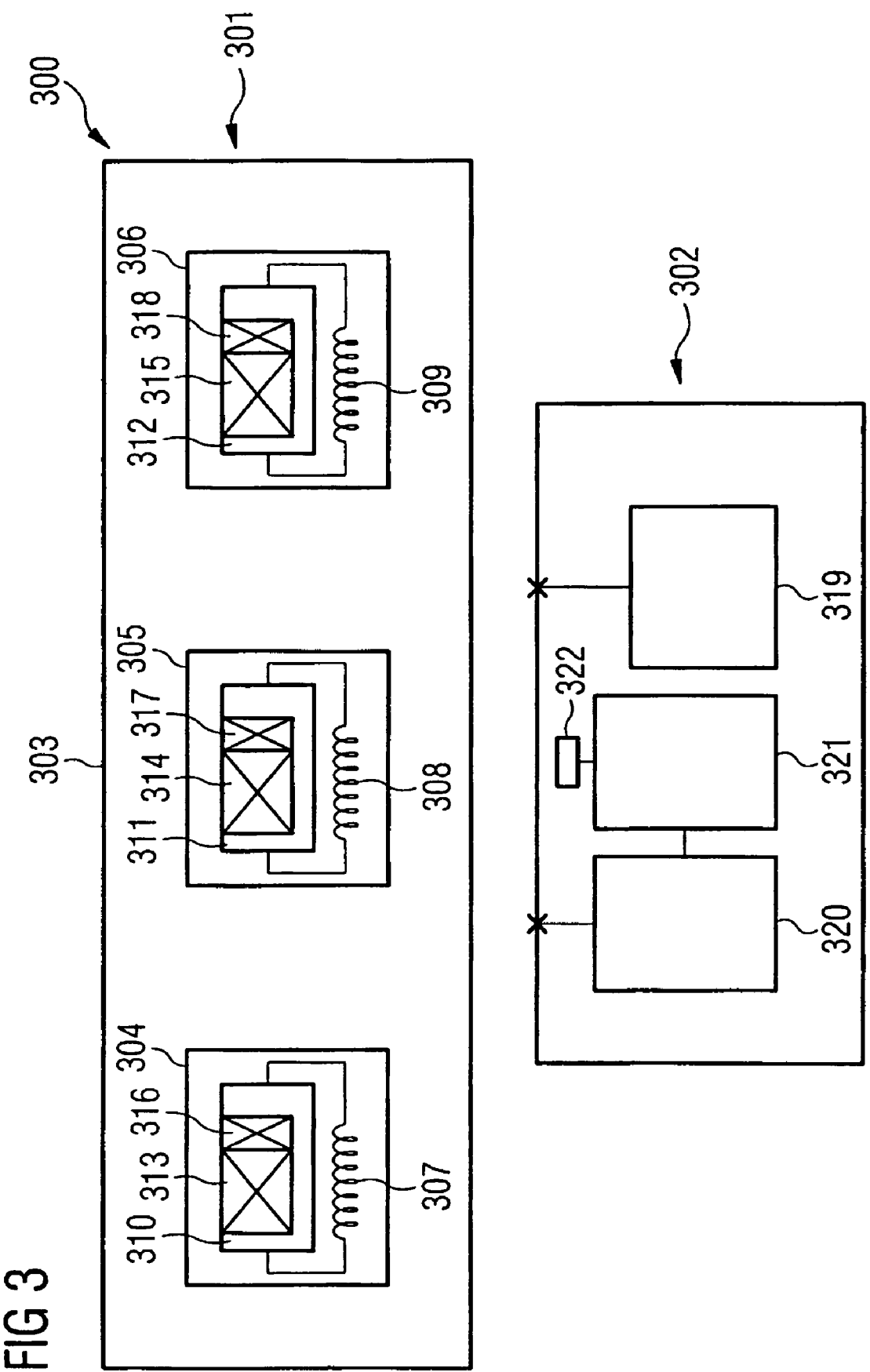
FIG. 3 shows an identification system according to one exemplary embodiment of the invention.

An identification system 300 according to one exemplary embodiment of the invention will be described in the following text with reference to FIG. 3.

The identification system 300 is designed for identification of maintenance information corresponding to the maintenance of a machine 303 to be maintained, and contains an identification data-storage medium arrangement 301 and a read apparatus 302 for reading maintenance payload data contained in the identification data-storage medium arrangement 301.

The identification data-storage medium arrangement 301 contains a first RFID tag 304, a second RFID tag 305 and a third RFID tag 306 which, for example, are attached to the machine 303 to be maintained, using an adhesive strip. Each of the RFID tags 304 to 306 contains a transmitting/receiving antenna 307 to 309, a silicon chip 310 to 312 with a circuit (not shown) monolithically integrated in it, with the integrated circuit in each case having a respective payload data subarea memory 313 to 315 and a respective payload data linking data memory 316 to 318. Some of the maintenance information corresponding to the maintenance of the machine 303 to be maintained is stored in each of the payload data subarea memories 313 to 315. Overall, the maintenance information is of the order of magnitude of 3 Kbytes. Furthermore, payload data linking information is stored in the payload data linking memories 316 to 318 and is used to assemble the individual payload data packet in the correct sequence and without any gaps corresponding to the payload data subarea memories 313 to 315, and thus to cohesively recover all of the maintenance data.

The read apparatus 302 for reading payload data contained in the identification data-storage media 304 to 306 contains an electromagnetic radiation source 319 for emission of electromagnetic radiation in a frequency range which can be predetermined and can be received by the transmitting/receiving antennas 307 to 309 of the identification data-storage media 304 to 306.

Furthermore, the read apparatus 302 contains a detection device 320 for detection of signals which are transmitted from the transmitting/receiving antennas 307 to 309 of the identification data-storage media 304 to 306, which signals contain the payload data subareas 313 to 315 as well as associated payload data linking data 316 to 318. The read apparatus 302 furthermore contains a determination device 321 for determination of the payload data subareas 313 to 315, of the associated payload data linking data 316 to 318 and, finally of all of the maintenance data, by linking the payload data subareas 313 to 315 in a corresponding manner to the associated payload data linking data 316 to 318.

The method of operation of the identification system 300 will be described in the following text.

A user operates the read apparatus 302 in order to write information to the identification data-storage media 304 to 306, or to read information from them. On the basis of the described exemplary embodiment, the payload data information which is stored in the RFID tags 304 to 306 is maintenance information, appropriate for the maintenance of the machine 303.

In order to actuate the RFID tags 304 to 306, the electromagnetic radiation source 319 emits electromagnetic radiation which can be absorbed by the transmitting/receiving antennas 307 to 309. This electromagnetic radiation energy is used to supply electrical power to the integrated circuits (not shown) on the silicon chips 310 to 312 in the RFID tags 304 to 306, and is also used to actuate the RFID tags 304 to 306. The received AC voltage can first of all be rectified by means of a rectifier circuit in the integrated circuits, in order to make it possible to supply a DC voltage to the integrated circuit components. Furthermore, the transmitting/receiving antennas 307 to 309 emit electromagnetic radiation, with the respective payload data subareas 313 to 315 and the associated payload data linking data 316 to 318 being coded in the electromagnetic radiation that is emitted. These re-emitted electromagnetic waves are received by the detection device 302, and are passed to the determination arrangement 321. This decodes the data and assembles the individual payload data subareas 313 to 315 in accordance with the payload data linking data 316 to 318 such that the payload data is produced in a cohesive form in the read apparatus 302 and, for example, can be printed out on a screen or on a printer. It is thus possible by means of a single reader to provide fundamentally any desired amount of information as appropriate for the maintenance of the machine 303 in the RFID tags 304 to 306, in a coded form.

Furthermore, the read apparatus 302 has an error determination device 322 which is coupled to the determination device 321. If an error occurs during the determination of the payload data (for example because the data items do not match one another without any gaps, because the reliability of the determined data has fallen below a threshold value or because some other error or fault has occurred), then this incorrect data combination is determined by the error determination device 322. Furthermore, the error determination device 322 can produce an appropriate alarm or an appropriate indication, for example "the second RFID tag 205 has transmitted incorrect information! Please try to read the information stored in it once again!".

It is therefore intended that the foregoing detailed description be regarded as illustrative rather than limiting, and that it be understood that it is the following claims, including all equivalents, that are intended to define the spirit and scope of this invention.

The invention claimed is:

1. An information data-storage medium arrangement storing payload data broken into a plurality of payload data subareas, comprising:
a plurality of identification data-storage media, each of the plurality of identification data-storage media comprising:
a substrate;
an antenna formed on and/or in the substrate; and an integrated circuit formed on and/or in the substrate, the integrated circuit coupled to the antenna;
wherein the integrated circuit comprises a memory circuit element storing at least one of the plurality of payload data subareas and payload data linking data associated to the at least one of the plurality of payload data subareas;
wherein the plurality of payload data subareas of the plurality of identification data-storage media are configured to be assembled to form payload data using the associated payload data linking data.

2. The identification data-storage medium arrangement of claim 1, wherein the payload data contains identification details.

3. The identification data-storage medium arrangement of claim 1, wherein the payload data contains product information data about a product.

4. The identification data-storage medium arrangement of claim 1, wherein the payload data comprises maintenance information data about the maintenance of a product.

5. The identification data-storage medium arrangement of claim 1, wherein the payload data linking data comprises a number identifying the identification data-storage medium storing the payload data linking data and the total number of identification data-storage media.

6. The identification data-storage medium arrangement of claim 1, wherein the payload data linking data comprises at least one of a start address or an end address for the associated payload data subarea within the payload data.

7. The identification data-storage medium arrangement of claim 1, wherein the payload data linking data comprises at least one of identification details for an identification data-storage medium which precedes the identification data-storage medium storing the payload data linking data or identification details for an identification data-storage medium which follows the identification data-storage medium storing the payload data linking data.

8. The identification data-storage medium arrangement of claim 1, wherein at least one of the identification data-storage media is a radio frequency identification tag.

9. A read apparatus for reading payload data stored in a plurality of identification data-storage media in an identification data-storage medium arrangement, wherein the payload data is broken into a plurality of payload data subareas and the plurality of payload data subareas can be assembled using associated payload data linking data, the read apparatus comprising:
a detection device for detecting signals by antennas of the identification data-storage media, wherein the signals of each of the identification data storage media comprise a respective payload data subarea and associated payload data linking data; and
a determination device for receiving the payload data linking data and the payload data subareas, and for reconstructing the payload data by linking the payload data subareas in accordance with the associated payload data linking data.

10. The read apparatus of claim 9, further comprising:
an electromagnetic radiation source for emission of electromagnetic radiation in a frequency range operative to be received by an antenna of the plurality of identification data-storage media.

11. The read apparatus of claim 9, wherein the read apparatus is designed for sequential reading of the plurality of identification data-storage media.

12. The read apparatus of claim 9, wherein the read apparatus is designed for simultaneous reading of the plurality of identification data-storage media.

13. The read apparatus of claim 9, further comprising:
an error identification device for identification and indication of incorrect linking of the payload data subareas.

14. An identification system, comprising:
an identification data-storage medium arrangement, storing payload data broken into a plurality of payload data subareas, comprising:
a plurality of identification data-store media, each of the plurality of identification data-storage media comprising:
a substrate;
an antenna formed on and/or in the substrate; and
an integrated circuit coupled to the antenna comprising a memory circuit element storing at least one of the plurality of payload data subareas and payload data linking data associated to the at least one of the plurality of payload data subareas; and
a read apparatus for reading payload data stored in the identification data-storage medium arrangement, comprising:
a detection device for detecting signals transmitted by the antennas of the plurality of identification data-storage media, wherein the signals of each of the identification data storage media comprise a respective payload data subarea and associated payload data linking data; and
a determination device for receiving payload data linking data and payload data subareas, and for reconstructing the payload data by linking the payload data subareas in accordance with the associated payload data linking data;
wherein the plurality of payload data subareas of the plurality of identification data-storage media are configured to be assembled to form payload data using the associated payload data linking data.

* * * * *